(12) United States Patent  
Remsburg

(10) Patent No.: US 7,382,269 B2  
(45) Date of Patent: Jun. 3, 2008

(54) MOLD AND FUNGUS GROWTH WARNING APPARATUS AND METHOD

(76) Inventor: Ralph Remsburg, 3626 Cobblefield Cir., Apt. 4, Caledonia, MI (US) 49316

( * ) Notice: Subject to any disclaimer, the term of this patent is extended or adjusted under 35 U.S.C. 154(b) by 184 days.

(21) Appl. No.: 11/028,389

(22) Filed: Jan. 3, 2005

(65) Prior Publication Data

US 2005/0156746 A1     Jul. 21, 2005

Related U.S. Application Data

(60) Provisional application No. 60/533,925, filed on Jan. 2, 2004, provisional application No. 60/534,279, filed on Jan. 5, 2004, provisional application No. 60/542,888, filed on Feb. 9, 2004, provisional application No. 60/598,614, filed on Aug. 4, 2004.

(51) Int. Cl.  
    *G08B 21/00*     (2006.01)
(52) U.S. Cl. .............. 340/602; 340/588; 340/521; 200/61.04
(58) Field of Classification Search ............ 340/602, 340/588, 589, 521, 522; 200/61.04, 61.06  
See application file for complete search history.

(56) References Cited

U.S. PATENT DOCUMENTS

| | | | | |
|---|---|---|---|---|
| 4,302,969 A | * | 12/1981 | Tavoni et al. | 73/170.16 |
| 4,403,296 A | * | 9/1983 | Prosky | 702/86 |
| 5,255,556 A | * | 10/1993 | Lobdell | 73/31.02 |
| 5,509,295 A | * | 4/1996 | Bartoli | 73/30.02 |
| 6,798,220 B1 | * | 9/2004 | Flanigan et al. | 324/696 |
| 6,965,708 B2 | * | 11/2005 | Luo et al. | 385/12 |
| 6,987,459 B2 | * | 1/2006 | Tice | 340/632 |
| 2001/0001927 A1 | * | 5/2001 | Jackson | 73/335.02 |
| 2004/0206097 A1 | * | 10/2004 | Smith et al. | 62/131 |
| 2005/0269418 A1 | * | 12/2005 | Fuller | 236/44 A |

FOREIGN PATENT DOCUMENTS

JP           11276194        * 12/1999

* cited by examiner

*Primary Examiner*—Davetta W. Goins  
*Assistant Examiner*—Edny Labbees  
(74) *Attorney, Agent, or Firm*—Timothy M. Barlow

(57) ABSTRACT

An apparatus for monitoring environmental conditions favorable for mold, mildew and fungus growth includes a microprocessor having a data map, a temperature sensor attached to the microprocessor, a relative humidity sensor attached to the microprocessor, an indicator array attached to the microprocessor, and a power supply attached to the microprocessor. The indicator array may be a single warning light or an array with a plurality of warning lights. The indicator array may also be an audio speaker. The indicator array may also include a message display for digitally displaying one or more ambient condition.

14 Claims, 17 Drawing Sheets

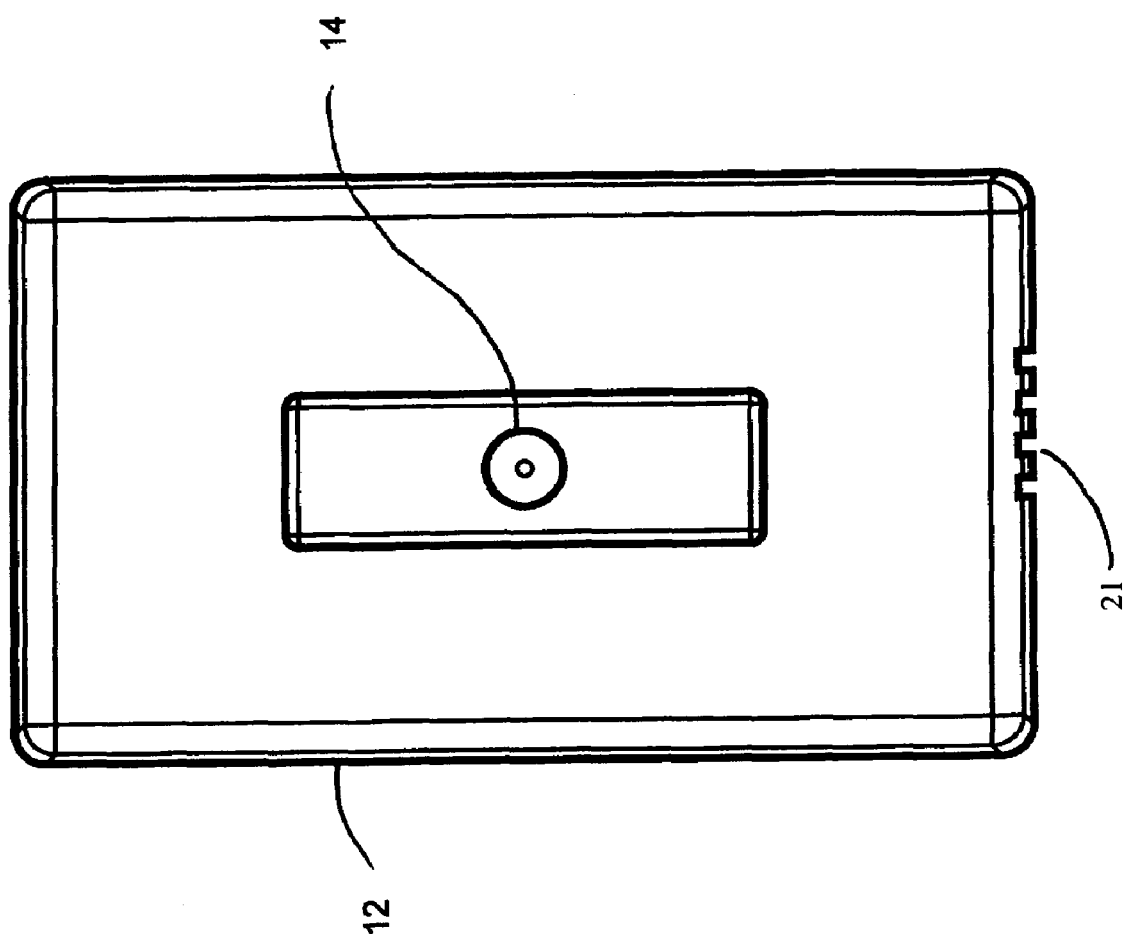

| Column 1 | | Column 2 | | Column 3 | |
| --- | --- | --- | --- | --- | --- |
| R. Humidity <69% | | R. Humidity 70% to 89% | | R. Humidity >89% | |
| T in °F | ACTIVE LED | T in °F | ACTIVE LED | T in °F | ACTIVE LED |
| ≤61 | None | ≤61 | None | ≤61 | None |
| 62 | None | 62 | None | 62 | None |
| 63 | None | 63 | None | 63 | None |
| 64 | None | 64 | None | 64 | None |
| 65 | None | 65 | None | 65 | RED |
| 66 | None | 66 | None | 66 | RED |
| 67 | None | 67 | None | 67 | RED |
| 68 | None | 68 | None | 68 | RED |
| 69 | None | 69 | None | 69 | RED |
| 70 | None | 70 | RED | 70 | RED |
| 71 | None | 71 | RED | 71 | RED |
| 72 | None | 72 | RED | 72 | RED |
| 73 | None | 73 | RED | 73 | RED |
| 74 | None | 74 | RED | 74 | RED |
| 75 | None | 75 | RED | 75 | FLASHING RED |
| 76 | None | 76 | RED | 76 | FLASHING RED |
| 77 | None | 77 | RED | 77 | FLASHING RED |
| 78 | None | 78 | RED | 78 | FLASHING RED |
| 79 | None | 79 | RED | 79 | FLASHING RED |
| 80 | None | 80 | RED | 80 | FLASHING RED |
| 81 | None | 81 | RED | 81 | FLASHING RED |
| 82 | None | 82 | RED | 82 | FLASHING RED |
| 83 | None | 83 | RED | 83 | FLASHING RED |
| 84 | None | 84 | RED | 84 | FLASHING RED |
| 85 | None | 85 | RED | 85 | FLASHING RED |
| 86 | None | 86 | RED | 86 | FLASHING RED |
| 87 | None | 87 | RED | 87 | FLASHING RED |
| 88 | None | 88 | RED | 88 | FLASHING RED |
| 89 | None | 89 | RED | 89 | RED |
| 90 | None | 90 | RED | 90 | RED |
| 91 | None | 91 | RED | 91 | RED |
| 92 | None | 92 | RED | 92 | RED |
| 93 | None | 93 | RED | 93 | RED |
| 94 | None | 94 | RED | 94 | RED |
| 95 | None | 95 | RED | 95 | RED |
| 96 | None | 96 | RED | 96 | RED |
| 97 | None | 97 | RED | 97 | RED |
| 98 | None | 98 | RED | 98 | RED |
| 99 | None | 99 | RED | 99 | RED |
| 100 | None | 100 | RED | 100 | RED |
| 101 | None | 101 | RED | 101 | RED |
| 102 | None | 102 | RED | 102 | RED |
| 103 | None | 103 | RED | 103 | RED |
| 104 | None | 104 | None | 104 | None |
| ≥105 | None | ≥105 | None | ≥105 | None |

Fig. 4A

| Column 1 | | Column 2 | | Column 3 | | Column 4 | |
|---|---|---|---|---|---|---|---|
| R. Humidity <50% | | R. Humidity 50% to 69% | | R. Humidity 70% to 89% | | R. Humidity >89% | |
| T in °F | ACTIVE LED | T in °F | ACTIVE LED | T in °F | ACTIVE LED | T in °F | ACTIVE LED |
| ≤61 | GREEN | ≤61 | GREEN | ≤61 | GREEN | ≤61 | GREEN |
| 62 | GREEN | 62 | GREEN | 62 | GREEN | 62 | GREEN |
| 63 | GREEN | 63 | GREEN | 63 | GREEN | 63 | GREEN |
| 64 | GREEN | 64 | GREEN | 64 | GREEN | 64 | GREEN |
| 65 | GREEN | 65 | GREEN | 65 | GREEN | 65 | YELLOW |
| 66 | GREEN | 66 | GREEN | 66 | GREEN | 66 | YELLOW |
| 67 | GREEN | 67 | GREEN | 67 | GREEN | 67 | YELLOW |
| 68 | GREEN | 68 | GREEN | 68 | GREEN | 68 | YELLOW |
| 69 | GREEN | 69 | GREEN | 69 | GREEN | 69 | YELLOW |
| 70 | GREEN | 70 | GREEN | 70 | YELLOW | 70 | RED |
| 71 | GREEN | 71 | GREEN | 71 | YELLOW | 71 | RED |
| 72 | GREEN | 72 | GREEN | 72 | YELLOW | 72 | RED |
| 73 | GREEN | 73 | GREEN | 73 | YELLOW | 73 | RED |
| 74 | GREEN | 74 | GREEN | 74 | YELLOW | 74 | RED |
| 75 | GREEN | 75 | YELLOW | 75 | RED | 75 | FLASHING RED |
| 76 | GREEN | 76 | YELLOW | 76 | RED | 76 | FLASHING RED |
| 77 | GREEN | 77 | YELLOW | 77 | RED | 77 | FLASHING RED |
| 78 | GREEN | 78 | YELLOW | 78 | RED | 78 | FLASHING RED |
| 79 | GREEN | 79 | YELLOW | 79 | RED | 79 | FLASHING RED |
| 80 | GREEN | 80 | YELLOW | 80 | RED | 80 | FLASHING RED |
| 81 | GREEN | 81 | YELLOW | 81 | RED | 81 | FLASHING RED |
| 82 | GREEN | 82 | YELLOW | 82 | RED | 82 | FLASHING RED |
| 83 | GREEN | 83 | YELLOW | 83 | RED | 83 | FLASHING RED |
| 84 | GREEN | 84 | YELLOW | 84 | RED | 84 | FLASHING RED |
| 85 | GREEN | 85 | YELLOW | 85 | RED | 85 | FLASHING RED |
| 86 | GREEN | 86 | YELLOW | 86 | RED | 86 | FLASHING RED |
| 87 | GREEN | 87 | YELLOW | 87 | RED | 87 | FLASHING RED |
| 88 | GREEN | 88 | YELLOW | 88 | RED | 88 | FLASHING RED |
| 89 | GREEN | 89 | GREEN | 89 | YELLOW | 89 | RED |
| 90 | GREEN | 90 | GREEN | 90 | YELLOW | 90 | RED |
| 91 | GREEN | 91 | GREEN | 91 | YELLOW | 91 | RED |
| 92 | GREEN | 92 | GREEN | 92 | YELLOW | 92 | RED |
| 93 | GREEN | 93 | GREEN | 93 | YELLOW | 93 | RED |
| 94 | GREEN | 94 | GREEN | 94 | YELLOW | 94 | YELLOW |
| 95 | GREEN | 95 | GREEN | 95 | YELLOW | 95 | YELLOW |
| 96 | GREEN | 96 | GREEN | 96 | YELLOW | 96 | YELLOW |
| 97 | GREEN | 97 | GREEN | 97 | YELLOW | 97 | YELLOW |
| 98 | GREEN | 98 | GREEN | 98 | YELLOW | 98 | YELLOW |
| 99 | GREEN | 99 | GREEN | 99 | YELLOW | 99 | YELLOW |
| 100 | GREEN | 100 | GREEN | 100 | YELLOW | 100 | YELLOW |
| 101 | GREEN | 101 | GREEN | 101 | YELLOW | 101 | YELLOW |
| 102 | GREEN | 102 | GREEN | 102 | YELLOW | 102 | YELLOW |
| 103 | GREEN | 103 | GREEN | 103 | YELLOW | 103 | YELLOW |
| 104 | GREEN | 104 | GREEN | 104 | GREEN | 104 | GREEN |
| ≥105 | GREEN | ≥105 | GREEN | ≥105 | GREEN | ≥105 | GREEN |

Fig. 4B

Mold and Fungus Growth Warning Apparatus Algorithm

T values in °F
RH values in %

IF T<65 OR T>103, No Indicator
IF RH<69%, No Indicator

IF RH>69 AND RH<90 AND T<70 THEN No Indicator
IF RH>69 AND RH<90 AND T>69 AND T<104 THEN Indicator = Red
IF RH>69 AND RH<90 AND T>103 THEN No Indicator IF RH>89 AND T<65 THEN No Indicator
IF RH>89 AND T>64 AND T<75 THEN Indicator = Red
IF RH>89 AND T>74 AND T<89 THEN Indicator = Flashing Red
IF RH>89 AND T>88 AND T<104 THEN Indicator = Red
IF RH>89 AND T>103 THEN No Indicator

Fig. 5A

Mold and Fungus Growth Warning Apparatus Algorithm

T values in °F
RH values in %

IF T<65 OR T>103, Light=Green
IF RH<50, Light=Green

IF RH>49 AND RH<70 AND T>74 AND T<89 THEN Light = Yellow

IF RH>69 AND RH<90 AND T>69 AND T<75 THEN Light = Yellow
IF RH>69 AND RH<90 AND T>88 AND T<104 THEN Light = Yellow
IF RH>69 AND RH<90 AND T>74 AND T<89 THEN Light = Red IF RH>89 AND T>64 AND T<70 THEN Light = Yellow
IF RH>89 AND T>93 AND T<104 THEN Light = Yellow
IF RH>89 AND T>69 AND T<75 THEN Light = Red
IF RH>89 AND T>88 AND T<94 THEN Light = Red
IF RH>89 AND T>74 AND T<89 THEN Light = Flashing Red

Fig. 5B

MOLD AND FUNGUS GROWTH WARNING APPARATUS AND METHOD

PRIORITY DATA

This application claims benefit of U.S. Provisional Patent Application Ser. No. 60/533,925 filed on Jan. 2, 2004, U.S. Provisional Patent Application Ser. No. 60/534,279 filed on Jan. 5, 2004, U.S. Provisional Patent Application Ser. No. 60/542,888 filed on Feb. 9, 2004, and U.S. Provisional Patent Application Ser. No. 60/598,614 filed on Aug. 4, 2004.

BACKGROUND

1. Field of the Invention

This invention relates generally to devices for measuring environmental conditions, and specifically to devices that indicate when environmental conditions are favorable to undesirable organic growth, such as mold, mildew and fungi.

Mold is a common allergen that can grow in many locations inside or outside a dwelling. It can also be found thriving inside building cavities, between walls. Mold is a very common indoor contaminant, and a common cause of illness. In a study of several hundred Tennessee homes in the United States, 49% had airborne concentrations of fungi greater than the concentration considered by some allergists to be acceptable to sensitive individuals. Only a few dozen of the thousands of different types of mold are commonly found in dwellings for humans.

Molds reproduce by releasing spores into the air. The spores are extremely small, about 1 micron or about 0.00004 inches. Mold counts are often 1,000 times higher than pollen counts. Although tiny parts of the parent mold colony can break off and be inhaled, usually, inhaled microscopic spores are the source of health problems. A person's allergic response is a biological reaction to the protein in mold, so the reaction can occur whether the inhaled spores are dead or alive. A thriving mold colony often releases various gases, including volatile organic compounds, that are also a problem for sensitive individuals.

Different species of mold have different health effects ranging from mild symptoms to death. In Cleveland, Ohio, in 1993, there were at least 34 cases of infants with bleeding in the lungs. The condition was related to the mold *Stachybotrys atra*. At least 10 deaths were recorded. Some species of the mold *Aspergillus* can infect the entire body of a person, causing lung damage or other serious illnesses. *Histoplasma capsulatum* can affect the lungs, but can also be systemic. A mold colony can use any organic material for food, and can even derive nutrition form a layer of dust on non-organic surfaces.

Mold requires five ingredients to thrive: food, air, a surface to grow upon, suitable temperature, and moisture. In an occupied building, little can be done to eliminate the first four conditions. In these instances, only the manipulation of moisture can be used to eliminate a mold colony or to prevent a new colony from forming.

Mold growth is related to relative humidity. Relative humidity levels below about 70% will not support excessive mold growth. However, indicated relative humidity levels below 70% do not ensure safety. Although a house may have 60% relative humidity, microclimates of higher relative humidity may exist throughout the house, especially near cooler surfaces. This is because cold air cannot support as much water moisture as warm air. Thus, for a given amount of water vapor in the air, the cooler air will have a higher relative humidity.

For example, assume the air in a house has a relative humidity of 60% at 21° C. (70° F.). The air outside the house is 10° C. (50° F.), and the air between the outside wall and the inner drywall is at 16° C. (60° F.). Furthermore, the air in the house and the air between the walls can circulate, which is very common. In this case, the 16° C. air within the wall cavity will have a relative humidity of 70%, and may support excessive mold growth.

2. Description of Prior Art

Temperature and humidity measurement are mature and well-developed arts. Numerous temperature and humidity measuring and monitoring devices have been developed. However, each of these devices has shortcomings making them inappropriate or ineffective for monitoring indoor environmental conditions for optimal mold and fungus growth conditions.

Some of these prior art devices measure rainfall and emphasize temperature measurements to determine the potential for mold growth. Other devices measure surface wetness, or condensed water vapor, to determine the potential for mold growth. These devices are of little use indoors.

Other devices measure temperature and relative humidity, and will alert a user when a single predetermined parameter is observed. However, such devices are not capable of determining when a combination of two or more conditions is observed. For example, mold growth depends on a specific relationship between temperature and moisture. Neither a specific temperature or moisture value nor a range of temperature or moisture values will provide optimal conditions for mold growth. Both temperature and relative humidity must be compared to determine if conditions are right for mold or fungus growth.

Thus, there exists a need for a device that alerts a homeowner or dwelling occupant to the unobvious combination of environmental conditions that are conducive to unseen and destructive mold and fungus growth and assigns a threat level to the problem.

OBJECTS OF THE INVENTION

According to the present invention there is provided a device to monitor and measure temperature and relative humidity conditions and an indicator to warn when environmental conditions are favorable for undesirable organic growth such as mold, mildew, and fungi. The device allows the informed user to take steps to reduce or eliminate the conditions that are beneficial for such growth.

Another object of the invention is to indicate a relative level of mold or fungus growth risk.

Still another object of the present invention is to provide the mold and fungus growth warning apparatus in a portable, battery-powered unit.

SUMMARY

In accordance with the present invention, a device is provided to monitor and measure temperature and humidity conditions. The device enters the temperature and relative humidity values into a data map to determine the corresponding hazard level for those temperature and relative humidity conditions. The device indicates when environmental conditions are favorable or unfavorable for unseen and destructive organic infestations such as mold, mildew, and fungi. The relative hazard level is displayed visually or audibly. Alternatively, the rising level of potential for mold and fungus growth may be visually presented in a traffic signal configuration. This configuration shows the increasingly favorable growth conditions as a change from a green indicator, to a yellow indicator, to a red indicator, and finally to a flashing red indicator warning of extreme susceptibility for unseen mold and fungus growth.

BRIEF DESCRIPTION OF THE DRAWINGS

FIGS. 1A and 1B show plan views of the mold and fungus growth warning apparatus, in accordance with the invention;

FIGS. 4A to 4B show, in tabular form, examples of map data for the mold and fungus growth warning apparatus, in accordance with the invention;

FIGS. 5A and 5B show algorithms for indicator operation for the mold and fungus growth warning apparatus, in accordance with the invention;

DETAILED DESCRIPTION OF THE DRAWINGS

In accordance with the present invention, a device is provided to monitor temperature and humidity conditions. The device enters the temperature and relative humidity values into a data map to determine the corresponding hazard level for the observed temperature and relative humidity conditions. The device indicates when environmental conditions are favorable or unfavorable for unseen and destructive organic infestations such as mold, mildew, and fungi.

Figure 1B:
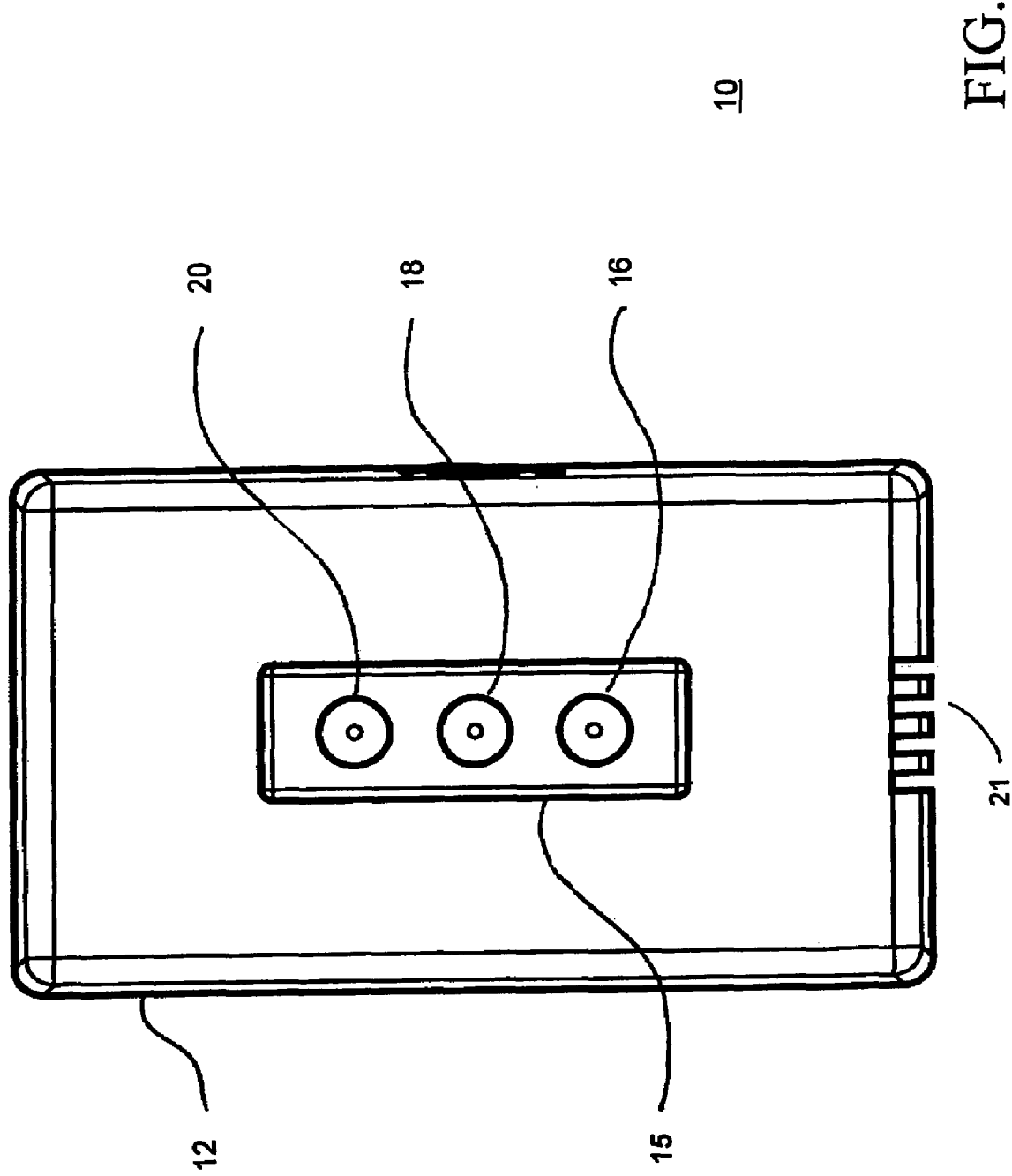

Referring to FIGS. 1A and 1B, plan views of a mold and fungus growth warning apparatus 10 are shown. The mold and fungus growth warning apparatus is primarily an electronic device enclosed in a mechanical housing 12. Housing 12 may be constructed from a low-cost injection moldable plastic such as ABS (Acrylonitrile Butadiene Styrene) although almost any material or combination of materials can be used. FIGS. 1A and 1B are alternative arrangements. Additional information may be displayed within the scope of the disclosure.

FIG. 1A shows a housing 12 with an indicator 14. In this embodiment, the indicator 14 is colored red. Because the mold and fungus growth warning apparatus 10 is an electronic device, a Light Emitting Diode (LED) is an appropriate technology for the indicator 14. FIG. 1B shows a housing 12 having a light display area 15. This embodiment includes three indicators 16, 18, 20 of different colors (green, yellow, red), depicting different and distinct mold and fungus growth hazard levels. Other colors or arrangements of indicators may be used within the scope of this disclosure.

The housing 12 includes a cavity opening 21 to allow ambient air to circulate inside housing 12 where various sensors may be located. The cavity opening 21 is generally located at the bottom of the mold and fungus growth warning apparatus 10 so that dust and debris will not fall into the cavity.

Figure 2A:
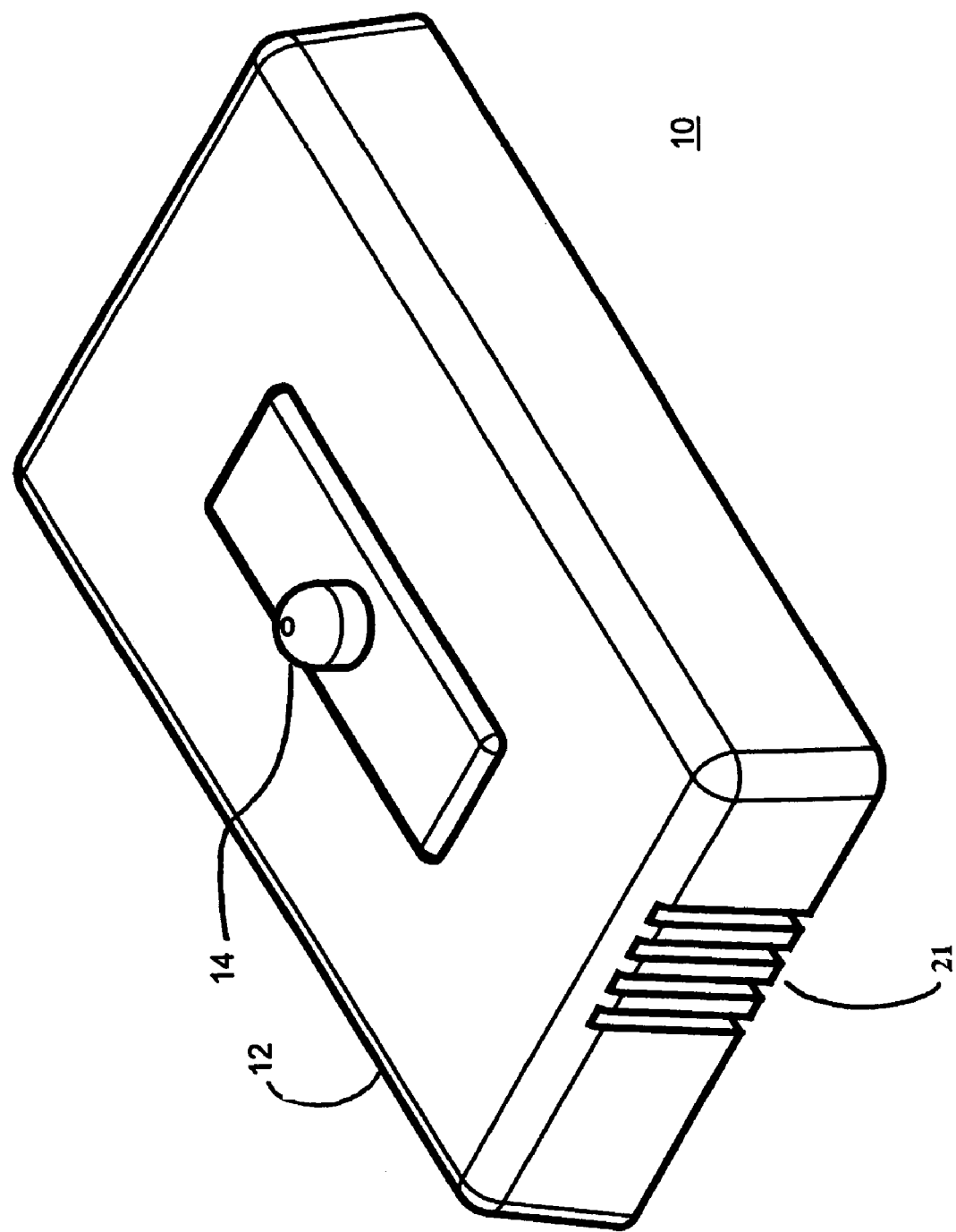
FIGS. 2A and 2B show isometric views of the mold and fungus growth warning apparatus, in accordance with the invention.
Figure 2B:
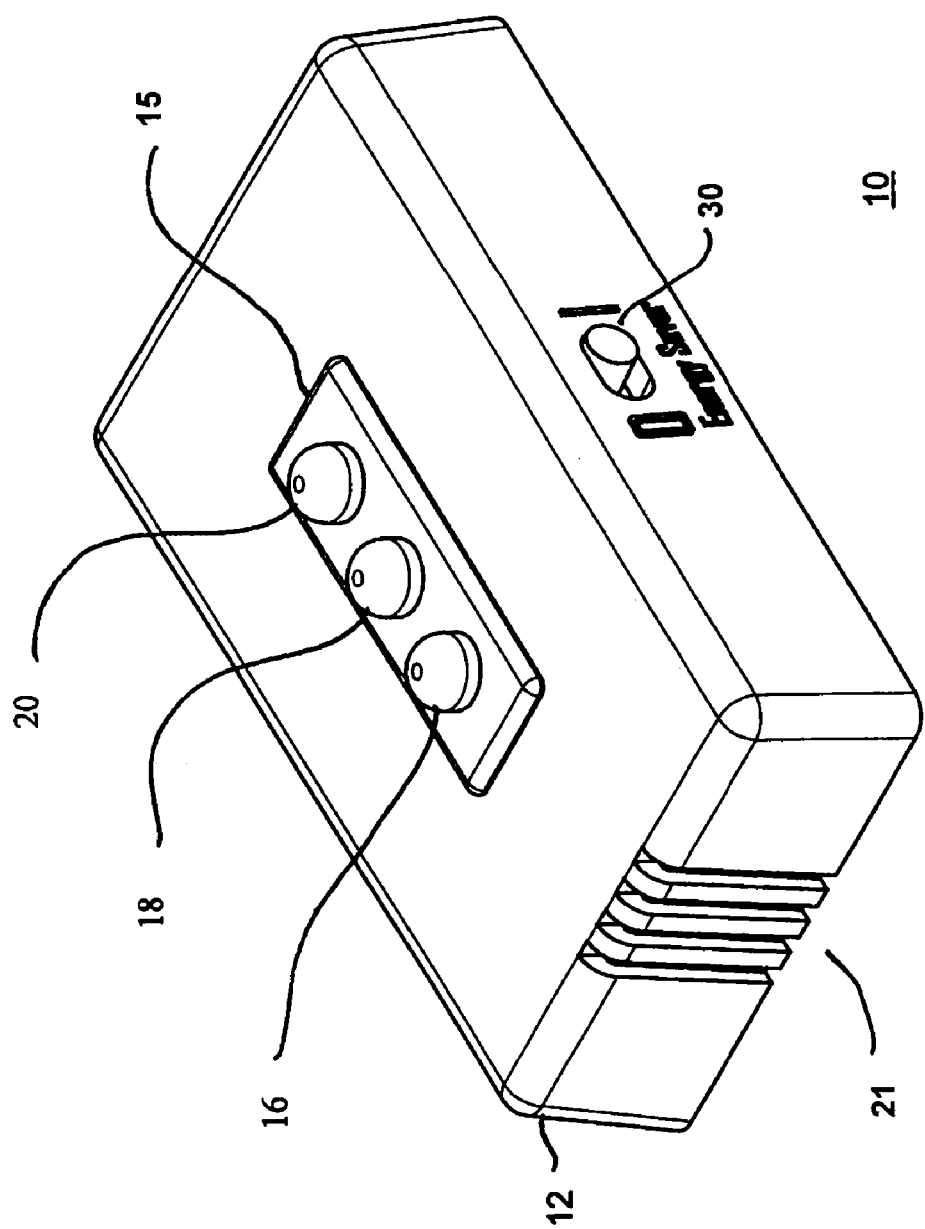

Referring now to FIGS. 2A and 2B, the indicators 14, 16, 18, 20 protrude from the surface of housing 12. Location of the indicators 14, 16, 18, 20 in this manner allows the indicator to be viewed at extreme angles beyond perpendicular to the housing 12 surface. In FIG. 2B, a two-position energy saver switch 21 is visible. The energy saver switch activates and deactivates the indicator 14, 16 based upon ambient conditions or user input.

Figure 3A:
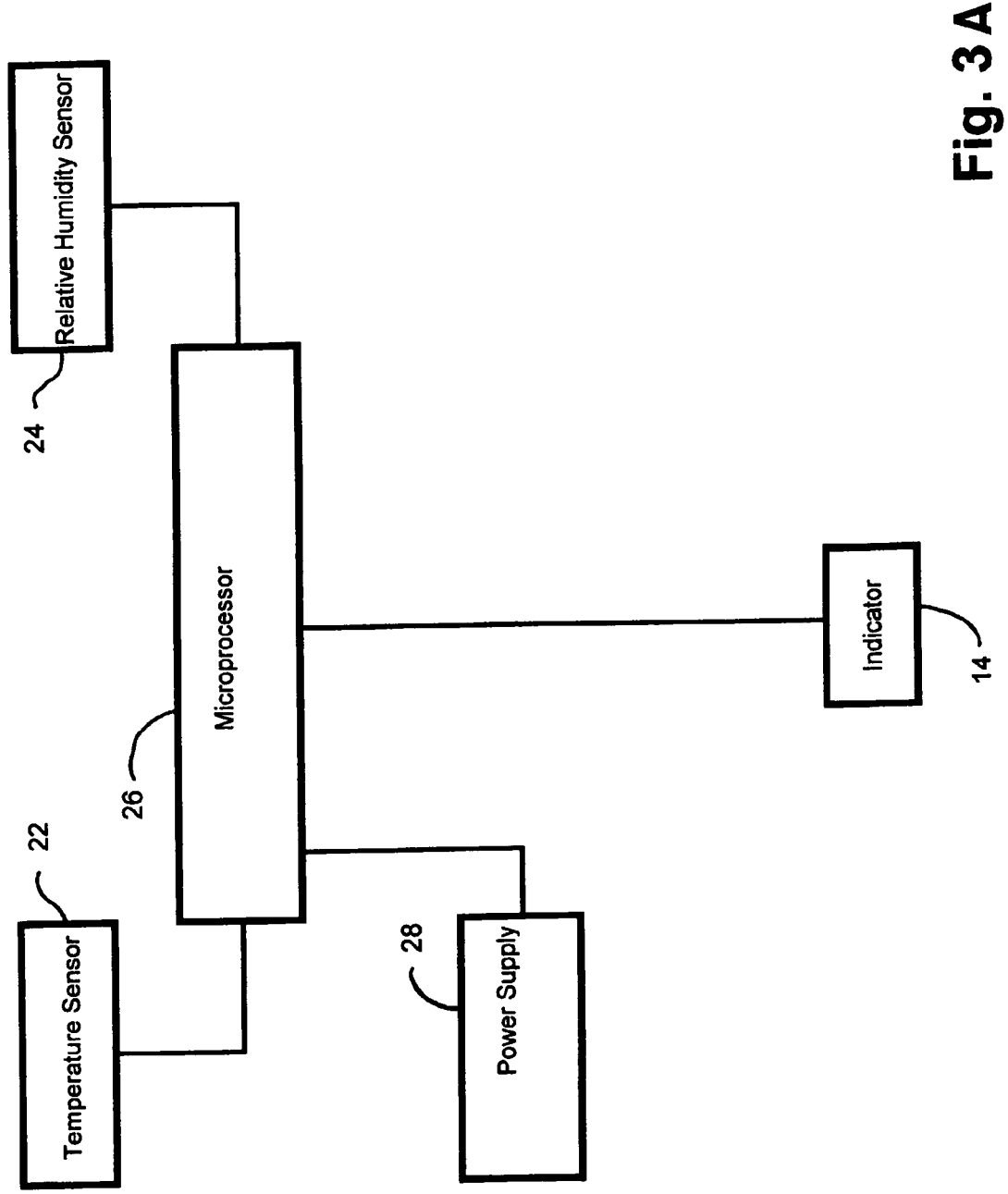
FIGS. 3A and 3B depict electrical block diagrams for the mold and fungus growth warning apparatus, in accordance with the invention.

FIG. 3A shows an electrical block diagram for the mold and fungus growth warning apparatus 10. A temperature sensor 22 and a relative humidity sensor 24 provide input signals to a microprocessor 26. Temperature and humidity sensors are well known in the art. The sensors 22, 24 may be discreet components such as a thermistor and a resistive humidity sensor that require additional signal manipulation, or may provide temperature sensing and humidity sensing along with signal conditioning integrated into a single device. The Honeywell HIH-3602 series is typical of such integrated sensors. The Honeywell HIH-3602 device combines a laser-trimmed thermoset polymer capacitive sensing element with on-chip signal conditioning. A thermistor or RTD is in thermal contact with the relative humidity sensor. In one embodiment, the temperature sensor 22 has an accuracy tolerance of ±2° F. (±1.1° C.) and a range of 32° F. to 122° F. (0° C. to 50° C.). The relative humidity sensor 24 has an accuracy tolerance of ±3% and a range of 20% to 95% in a non-condensing atmosphere. Of course, sensors with higher or lower accuracies and ranges may be used according to the application.

The requirements for microprocessor 26 can be met by a variety of such devices. In one embodiment, an important requirement is low power consumption when an internal battery power supply 28 is used instead of external power. A device in the Motorola HCS08 series may be used for microprocessor 26. This device has multiple power modes and an internal clock for auto wake-up to extend battery life. Battery power supply 28 will generally be comprised of one or more dry-cell batteries. Depending on microprocessor 26 and other circuitry choices, additional power conditioning may be required.

A red indicator 14 is provided in a simple embodiment. LED indicators having a diameter of about 5 mm (0.197 inches) and a viewing angle of greater than 400 will meet the needs of most users and are readily available and easily integrated into the design of mold and fungus growth warning apparatus 10, though numerous other indicators are available.

Figure 3B:
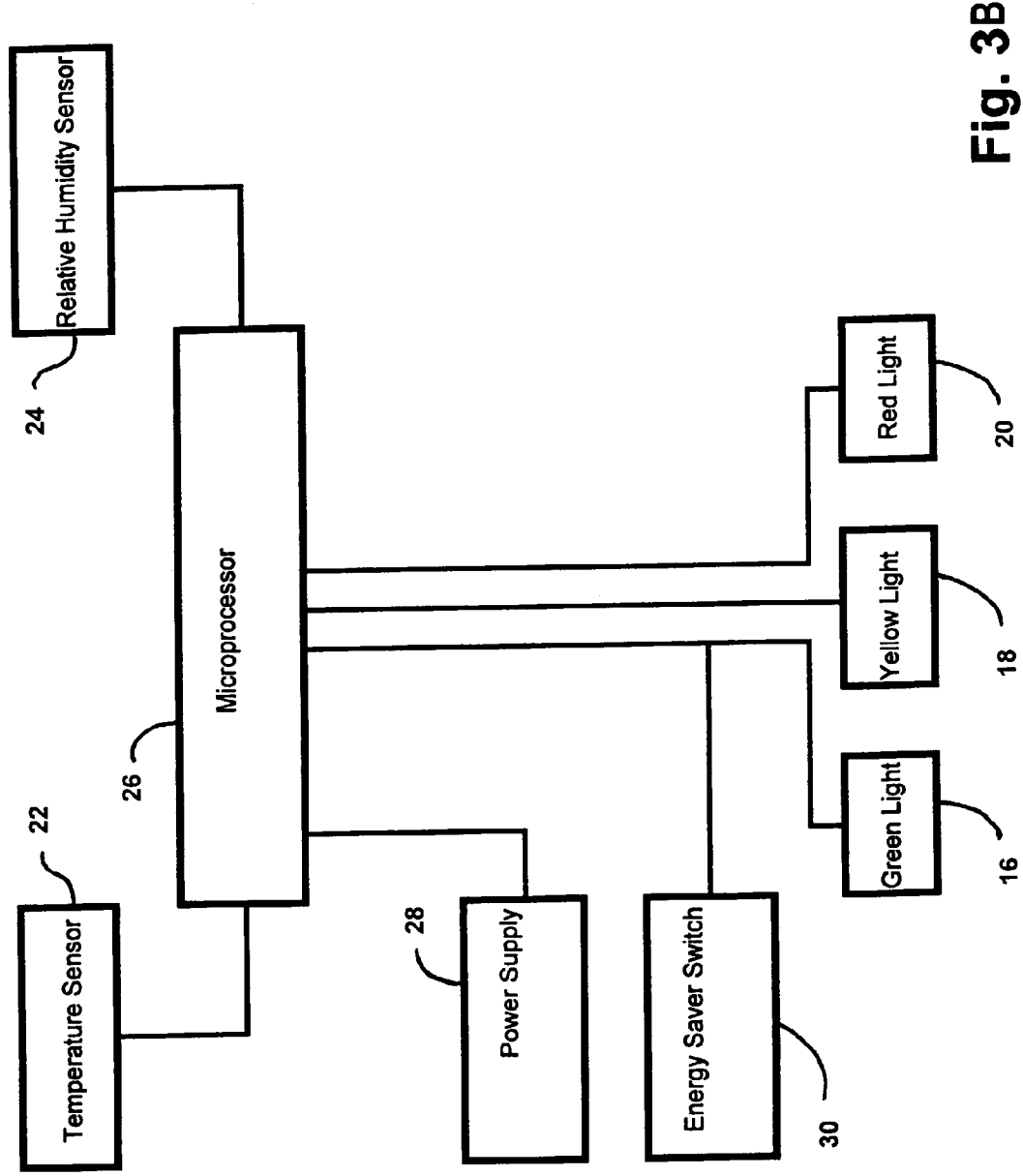

FIGS. 3A and 3B show an electrical block diagram of alternative embodiments of the present invention. FIG. 3A is an electrical diagram for a simple apparatus with a single indicator. FIG. 3B depicts a more complex apparatus having a plurality of indicators, each dedicated to a particular task. An energy saver switch 30 reduces power consumption.

FIGS. 4A and 4B are internal maps of temperature and humidity combinations that are likely to be encountered indoors and that are conducive to organic growth such as mold, mildew, and fungi. The overall map is broken into columns corresponding to a range of relative humidity levels.

FIG. 4A corresponds to FIGS. 1A, 2A and 3A, and is divided into three columns. Each column represents a discrete relative humidity range. Column 1 of FIG. 4A indicates the actions to occur when the relative humidity 69% or below. Column 2 indicates the actions to occur when the relative humidity is 70% through 89%. Column 3 indicates the actions to occur when the relative humidity is above 89%. This is a simple but effective way to display conditions where only one indicator 14 is used. In another embodiment the indicator 14 may be an audio speaker that emits a tone to alert the user to potentially hazardous mold and fungus growth conditions.

FIG. 4B corresponds to FIGS. 1B, 2B and 3B, and is divided into four columns. Column 1 of FIG. 4B indicates the actions to occur when the relative humidity is below 50%. Column 2 indicates the actions to occur when the relative humidity is 50% through 69%. Column 3 indicates the actions to occur when the relative humidity is 70% through 89%. Column 4 indicates the actions to occur when the relative humidity is above 89%. This is one way to display conditions where three indicators 16, 18, 20 are used. In another embodiment the indicators 16, 18, 20 may be an audio speaker that emits a tone to alert the user to potentially hazardous mold and fungus growth conditions.

A green light, a yellow light, and a red light are provided in this embodiment, corresponding to indicators 16, 18, 20. LED indicators are preferred choices due to their illumination and power consumption characteristics. The plurality of indicators 16, 18, 20 provide a greater number of responses to ambient temperature and relative humidity conditions.

FIGS. 5A and 5B depict sample algorithms for the operation of the mold and fungus growth warning apparatus 10. FIGS. 5A and 5B correspond to FIGS. 4A and 4B, respectively.

Figure 6:
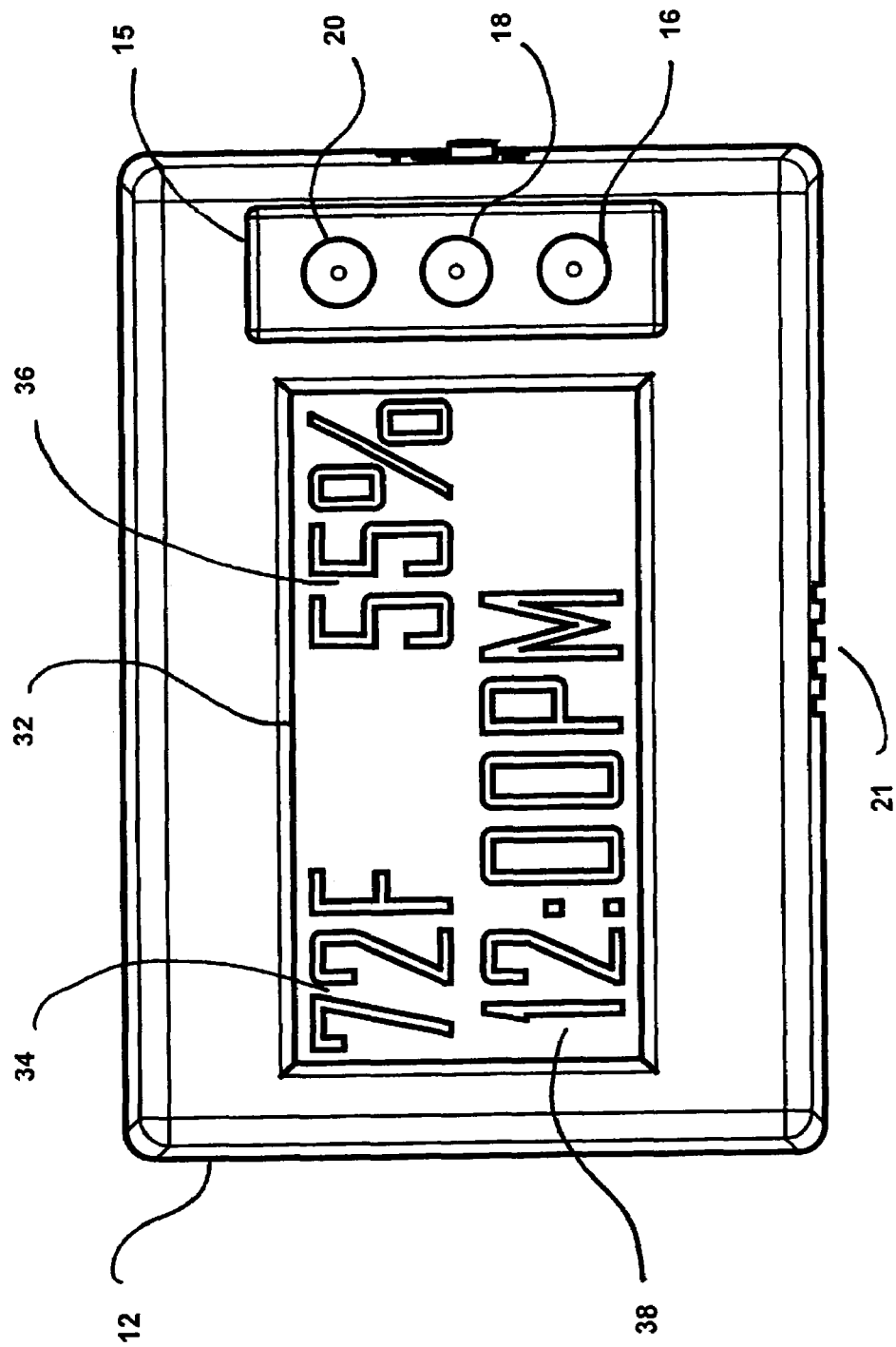
FIG. 6 shows a plan view of an embodiment of the mold and fungus growth warning apparatus, in accordance with the invention.

FIG. 6 shows a plan view of another embodiment of the mold and fungus growth warning apparatus 10, in accordance with the invention. This embodiment includes a digital display 32 for displaying the ambient temperature 34 and relative humidity 36 conditions. Another embodiment includes a time of day display 38. In this example, the green indicator 16 is at the bottom of the light display area 15, and corresponds to low mold and fungus growth conditions. The yellow indicator 18 is at the middle of the light display area 15, and corresponds to moderate mold and fungus growth conditions. The red indicator 20 is at the top of the light display area 15, and corresponds to high mold and fungus growth conditions.

Figure 7:
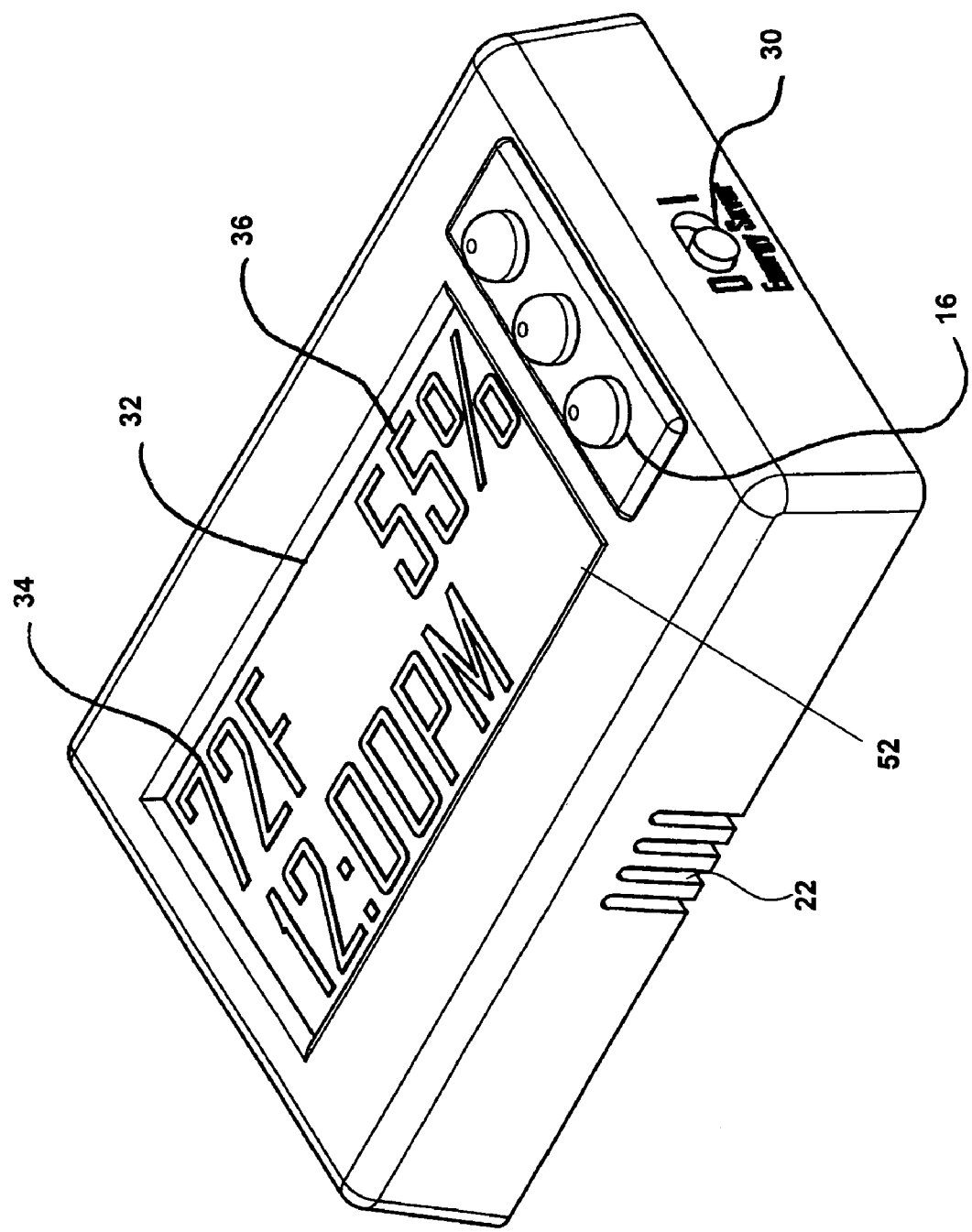
FIG. 7 shows an isometric view of an embodiment of the mold and fungus growth warning apparatus while the apparatus is in a normal state of operation, in accordance with the invention.

FIG. 7 shows an isometric view of an embodiment of the mold and fungus growth warning apparatus 10 while the apparatus is in a normal state of operation, in accordance with the invention. The digital display shows 72 degrees F. and 55% relative humidity. These conditions are found in column 2 of FIG. 4B. The green indicator 16 is illuminated during normal operating conditions. Normal operating conditions corresponds to low mold and fungus growth conditions.

Figure 8:
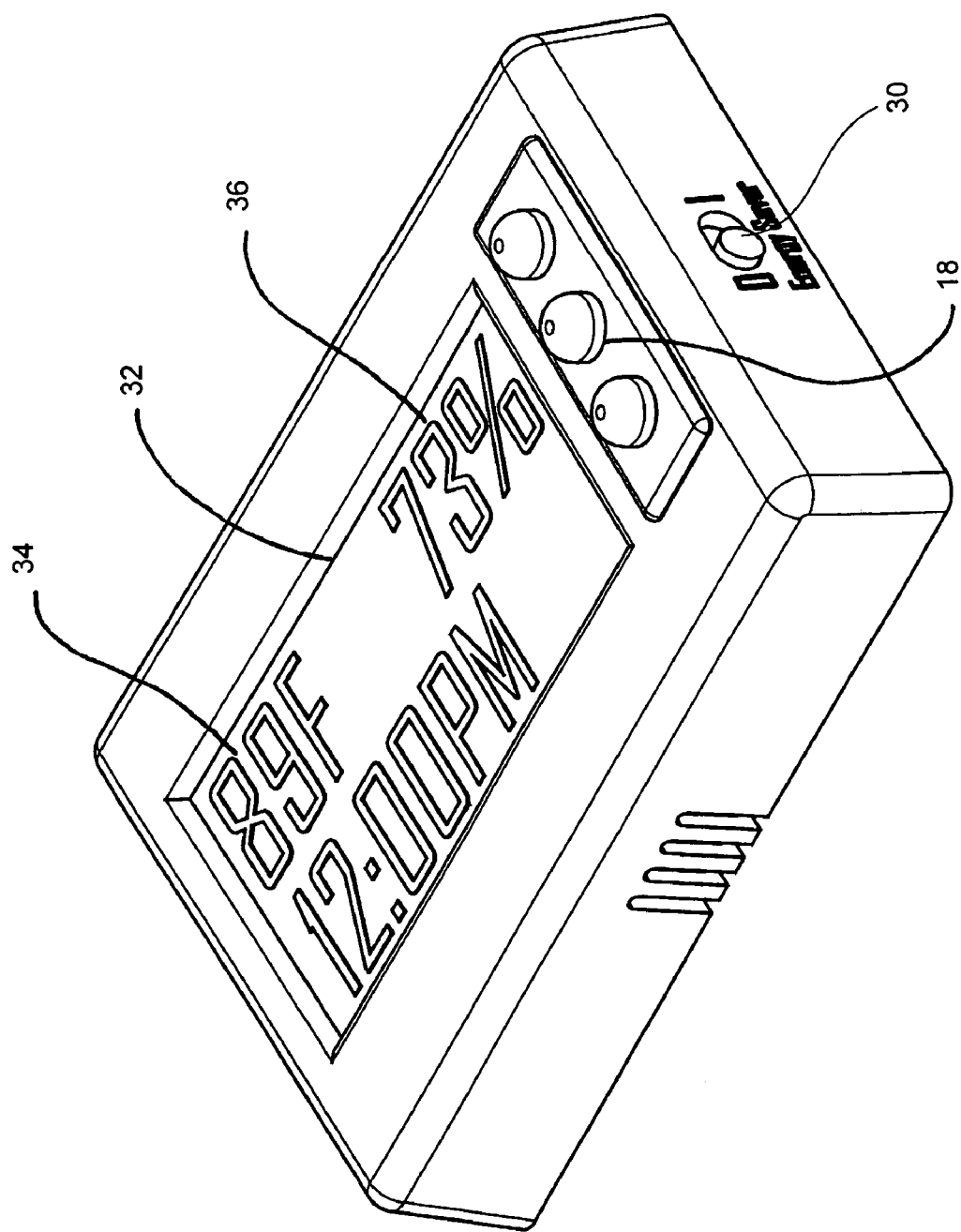
FIG. 8 depicts an isometric view of an embodiment of the mold and fungus growth warning apparatus during a first warning level, in accordance with the invention.

FIG. 8 depicts an isometric view of an embodiment of the mold and fungus growth warning apparatus 10 during a first warning level, in accordance with the invention. The digital display shows 89 degrees F. and 73% relative humidity. These conditions are found in column 3 of FIG. 4B. The yellow or amber indicator 18 is illuminated during a first warning level. The first warning level corresponds to moderate mold and fungus growth conditions.

Figure 9:
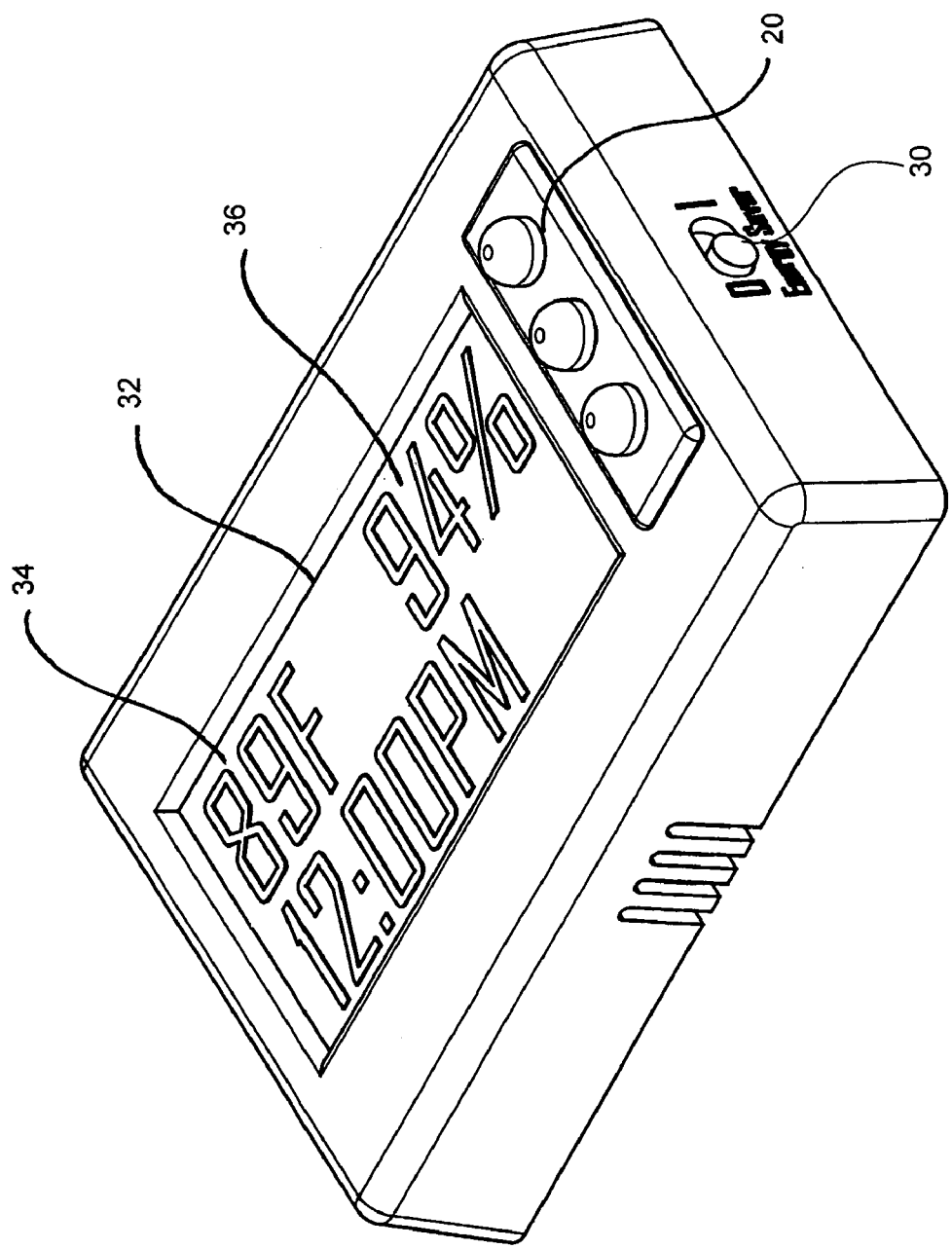
FIG. 9 illustrates an isometric view of an embodiment of the mold and fungus growth warning apparatus at the second warning level, in accordance with the invention.

FIG. 9 depicts an isometric view of an embodiment of the mold and fungus growth warning apparatus 10 at the second warning level, in accordance with the invention. The digital display shows 89 degrees F. and 94% relative humidity. These conditions are found in column 4 of FIG. 4B. The red indicator 20 is illuminated during a second warning level. The second warning level corresponds to high mold and fungus growth conditions.

Figure 10:
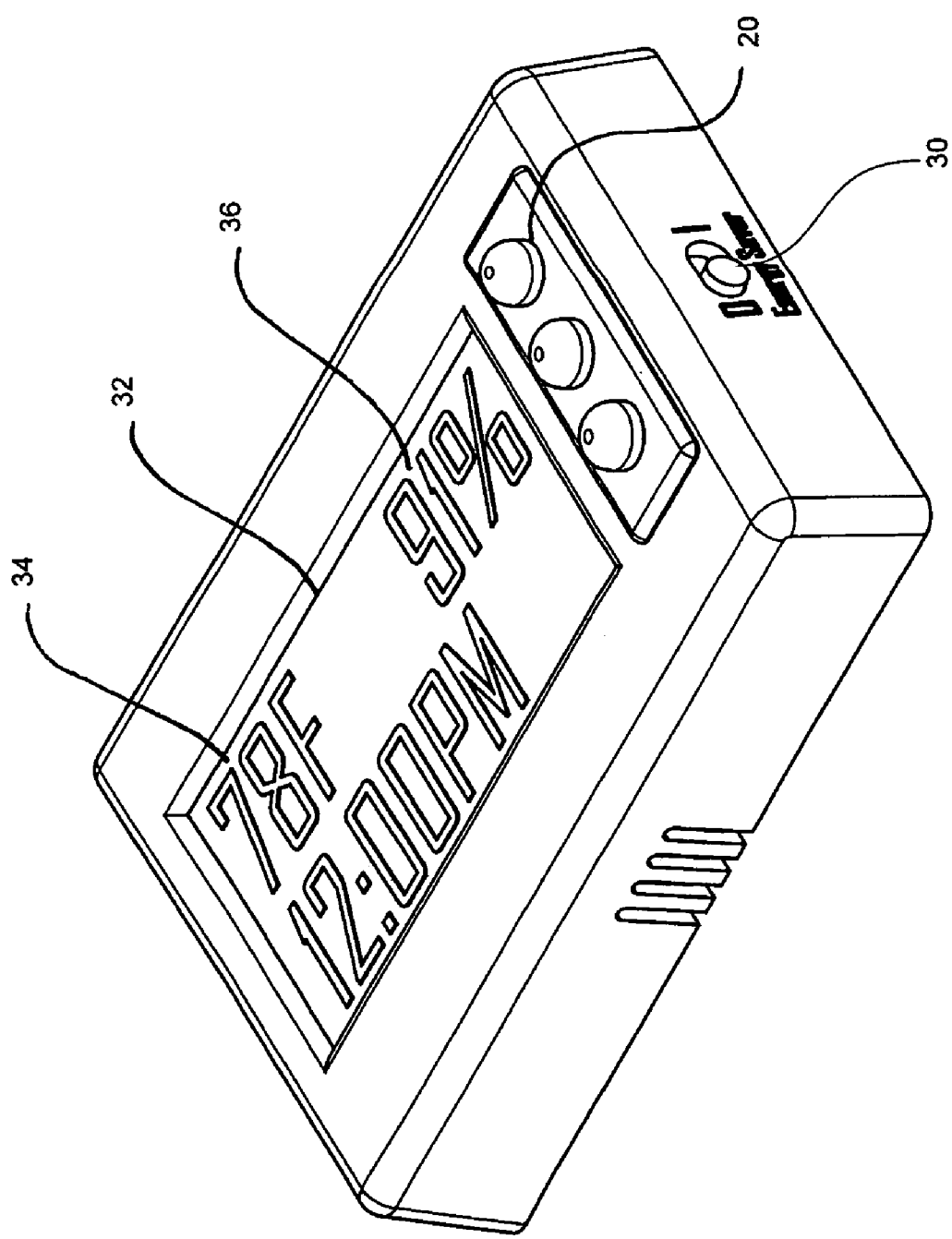
FIG. 10 is an isometric view of the preferred embodiment of the mold and fungus growth warning apparatus at the third (most severe) warning level, in accordance with the invention.

FIG. 10 is an isometric view of the preferred embodiment of the mold and fungus growth warning apparatus 10 at the third and most severe warning level, in accordance with the invention. The digital display shows 78 degrees F. and 91% relative humidity. These conditions are found in column 4 of FIG. 4B. The red indicator 20 is illuminated in a flashing mode during the third warning level. The third warning level corresponds to extreme mold and fungus growth conditions.

Figure 11:
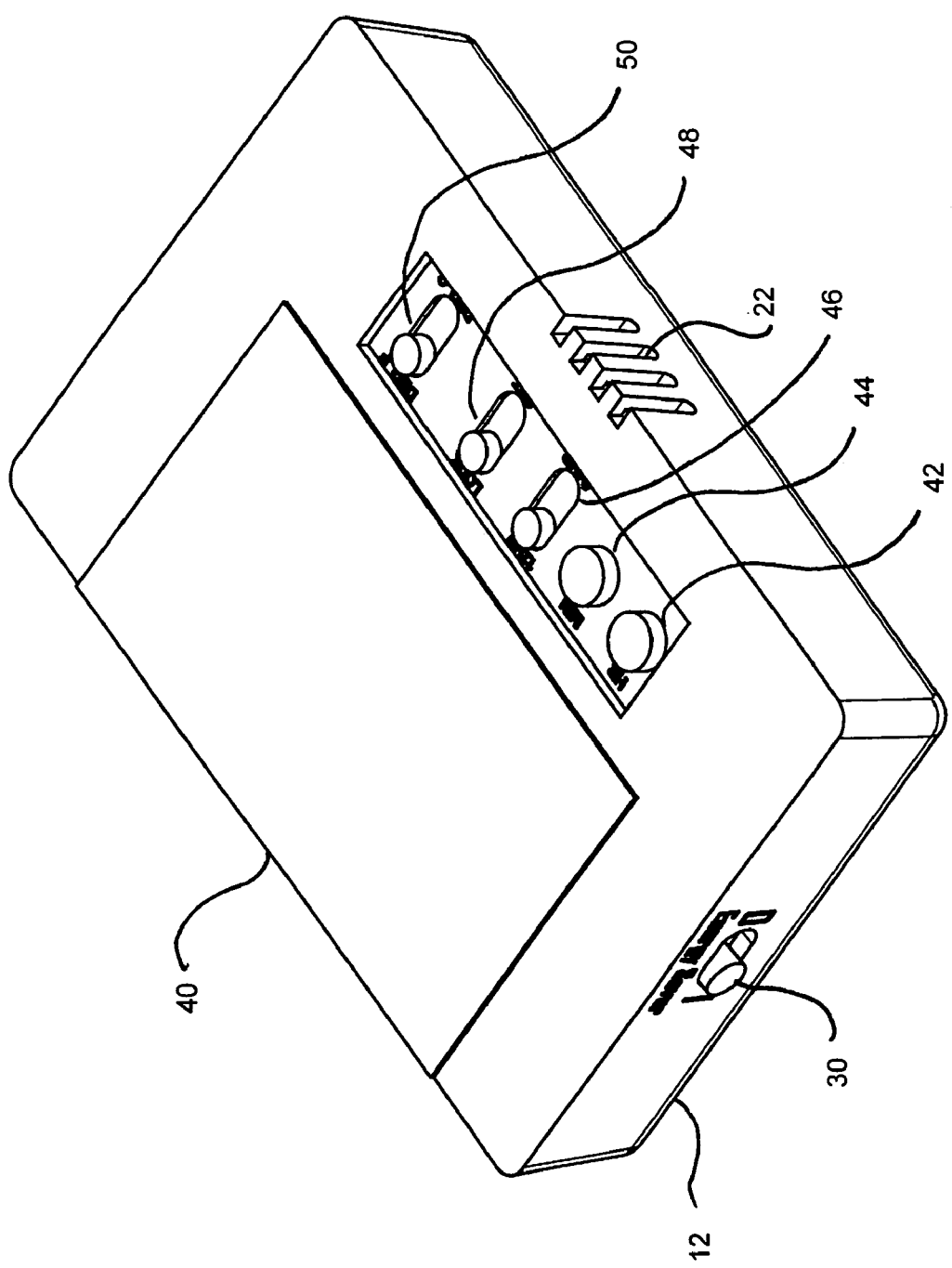
FIG. 11 shows a rear view of the preferred embodiment of the mold and fungus growth warning apparatus, in accordance with the invention.

FIG. 11 shows a bottom view of an embodiment of the mold and fungus growth warning apparatus 10, in accordance with the invention. The underside of the housing 12 includes a battery panel 40 to permit the user access to replace the battery. A change hours button 42 and change minutes button 44 allow the user to change the hour and minute display on the clock 38. Clock format button 46 allows the user to select a 12 hour or 24 hour clock. A temperature units button 50 allows the user to select the desired temperature units, such as degrees F. or degrees C. A lock setting switch 48 allows the user to disable buttons 42, 44, 46 and 50 to prevent inadvertent changes.

Figure 12:
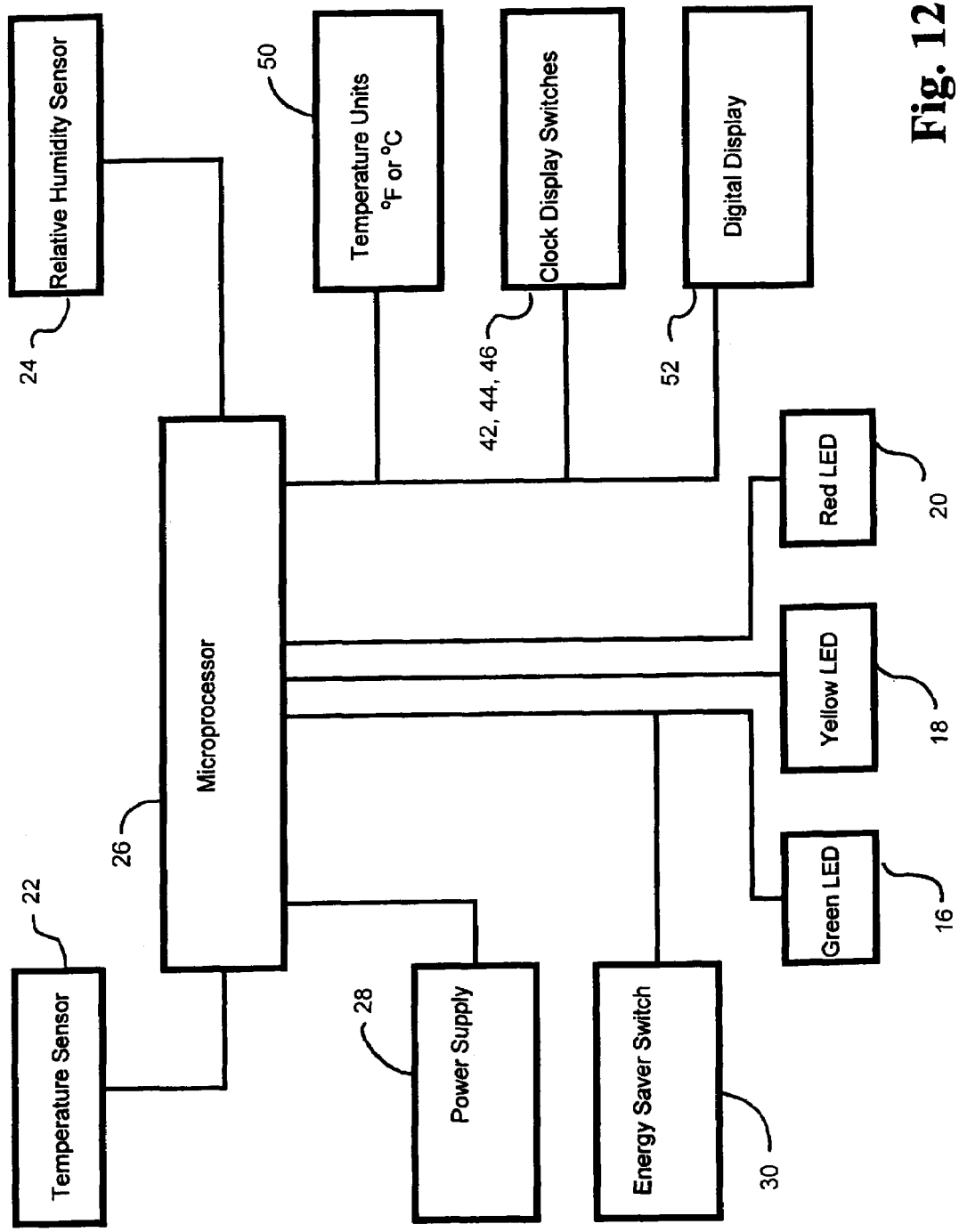
FIG. 12 depicts the electrical block diagram of the preferred embodiment of the mold and fungus growth warning apparatus, in accordance with the invention.

FIG. 12 depicts the electrical block diagram of an embodiment of the mold and fungus growth warning apparatus 10, in accordance with the invention. The device is built around a microprocessor 26 with a temperature and relative humidity data map. A temperature sensor 22 and relative humidity sensor 24 are attached to the microprocessor 26 to provide inputs. A power supply 28 is attached to the microprocessor 26 and supplies power to the entire device. A green indicator 16, a yellow indicator 18 and a red indicator 20 are attached to the microprocessor 26. An energy saver switch 30 is attached to the microprocessor 26. In one embodiment, the energy saver switch 30 is attached between the green indicator 16 and the microprocessor 26. A digital display 52 is attached to the microprocessor 26 to provide temperature, relative humidity or time readouts. Clock display switches 42, 44, 46 and temperature units button 50 are attached to the microprocessors when appropriate.

Operation

The mold and fungus growth warning apparatus should be placed in a location where the temperature and relative humidity conditions are representative of the entire building or monitored area. An appropriate location would be near the HVAC controls for the building. The power supply 28 supplies the necessary power to operate the mold and fungus growth warning apparatus 10. The power supply 28 may be a battery or other AC or DC power supply, depending upon the needs of the user. The microprocessor 26 may be on continuously, or may sleep periodically, depending on its design characteristics. When the microprocessor 26 is on, it is constantly receiving temperature and relative humidity inputs and determining the appropriate indicator display. In another embodiment, the microprocessor 26 has an active mode and a sleep mode to save energy. The microprocessor 26 "wakes up" periodically to obtain new readings from the temperature sensor 22 and relative humidity sensor 24. In one embodiment, the microprocessor 26 first determines the relative humidity and enters the appropriate column in the data map. Next, the microprocessor 26 determines the temperature. The microprocessor 26 next compares the temperature to the appropriate relative humidity in the data map to determine which indicator 14, 16, 18, 20 to illuminate.

FIGS. 4A and 4B show alternative data maps for microprocessor 26. FIG. 4A is for a simple mold and fungus growth warning apparatus 10 with only one indicator 14. FIG. 4B applies to a mold and fungus growth warning apparatus 10 with multiple indicators and display levels. The microprocessor 26 matches the relative humidity and temperature values to the map. For example, using FIG. 4B, if the relative humidity is below 50% then column 1 of FIG. 4B is used. If the relative humidity is 50% through 69% then column 2 of FIG. 4B is used. If the relative humidity is 70% through 89% then column 3 of FIG. 4B is used. If the relative humidity is above 89%, then column 4 of FIG. 4B is used.

The combination of relative humidity and temperature determines what action is to be performed by microprocessor 26. For example, consider that temperature sensor 22 detects a temperature of 72° F. (22.2° C.) and relative humidity sensor 24 detects a value of 75%. Again using FIG. 4B, the microprocessor 26 will enter the map at Column 3 for relative humidity values from 70% through 89%. In Column 3, the action shown for a temperature value of 72° F. (22.2° C.) is to activate the yellow indicator 18. Note that it is the combination of values from both the temperature sensor 22 and the relative humidity sensor 24 that will result in a particular action. Neither temperature alone nor relative humidity alone will trigger any action by the microprocessor 26.

For another example, consider that upon a periodic "wake up" by microprocessor 26, the temperature is 78° F. (25.6° C.) and the relative humidity is 91%. The relative humidity is greater than 89%, so Column 4 is appropriate. Within Column 4, a temperature of 78° F. (25.6° C.) indicates an action to continuously flash only the red indicator 20 because these conditions are optimal for mold and fungus growth.

During most normal environmental conditions, the green indicator 16 will be illuminated. Because indicator 16 simply means that there are no mold or fungus warnings or alerts, the indicator 16 can be turned off to conserve power. The placement of the energy saver switch 30 within the circuit means that the indicator 16 can be turned off without affecting the operation of any of the other circuits or warnings. The mold and fungus growth warning apparatus 10 can be programmed to illuminate the green indicator 16 when ambient conditions are such that the yellow indicator 18 and the red indicator 20 are not illuminated. When the energy saver switch 30 is activated and the green indicator 16 is extinguished, the mold and fungus can also be programmed to reset the energy saver switch 30 and illuminate the green indicator 16 when any button is pressed, at a predetermined time interval, or when the temperature or relative humidity change. This can be accomplished even if the temperature or relative humidity changes do not result in a change from the illumination of the green indicator 16 to the yellow indicator 18 or red indicator 20. This gives the user peace of mind that the mold and fungus growth warning apparatus 10 is functioning properly. Of course, the energy saver switch 30 can be disabled at any time by the user if a constant display is desired.

For comparison to FIGS. 1A, 2A, and 3A, which corresponds to the map in FIG. 4A, the indicator 14 will not be illuminated during most normal environmental conditions. This simplified device provides warnings only when the conditions are optimal for mold and fungus growth. This is equivalent to the red indicator 20 operation of FIGS. 1B, 2B, 3B and 4B.

FIG. 7 shows the digital display 52 where the temperature display 34 shows a value of 72° F. (22.2° C.) and the relative humidity display 36 shows a relative humidity value of 55%. FIG. 4B has the map data for mold and fungus growth warning devices having multiple indicators. For relative humidity values from 50% through 69%, no action is required for a temperature value of 72° F. (22.2° C.). Thus, the green indicator 16 is illuminated.

FIG. 8 shows the digital display 52 where the temperature display 34 shows a value of 89° F. (31.7° C.) and the relative humidity display 36 shows a relative humidity value of 73%. FIG. 4B has the map data for mold and fungus growth warning devices having multiple indicators. For relative humidity values from 70% through 89%, the yellow indicator 18 is illuminated for a temperature value of 89° F. (31.7° C.). Thus, the yellow indicator 18 is illuminated.

FIG. 9 shows the digital display 52 where the temperature display 34 shows a value of 89° F. (31.7° C.) and the relative humidity display 36 shows a relative humidity value of 94%. FIG. 4B has the map data for mold and fungus growth warning devices having multiple indicators. For relative humidity values greater than 89%, the red indicator 20 is illuminated for a temperature value of 89° F. (31.7° C.). Thus, the red indicator 20 is illuminated.

FIG. 10 shows the digital display 52 where the temperature display 34 shows a value of 78° F. (25.6° C.) and the relative humidity display 36 shows a relative humidity value of 91%. FIG. 4B has the map data for mold and fungus growth warning devices having multiple indicators. For relative humidity values greater than 89%, the red indicator 20 is illuminated in a flashing mode for a temperature value of 78° F. (25.6° C.). Thus, the red indicator 20 continuously flashes in response to these conditions.

Note that the values of both temperature and relative humidity have decreased from the values that warranted a red indicator 20 condition in FIG. 9. Intuitively, the lower temperature and relative humidity values would seem to be less hazardous and less conducive to mold and fungus growth. Yet the combination of lower values shown in FIG. 10 are a more serious risk for organic growth that the higher values of FIG. 9.

Heretofore, practitioners of the prior art lacked the understanding that only a combination of appropriate temperature and relative humidity will result in mold and fungus growth. The mold and fungus growth warning apparatus monitors, measures and acts in response to this unobvious combination of temperature and relative humidity values.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An apparatus for monitoring environmental conditions favorable for mold, mildew and fungus growth, comprising:
a microprocessor having a map, the map including a plurality of temperature and relative humidity combinations, and further including
a first group of temperature and relative humidity conditions that are not favorable to mold, mildew and fungus growth and corresponding to no indicator warning display on an indicator array attached to the microprocessor;
a second group of temperature and relative humidity combinations that could be favorable for mold, mildew and fungus growth and corresponding to a cautionary warning display on the indicator array; and
a third group of temperature and relative humidity combinations that are favorable for mold, mildew and fungus growth and corresponding to a warning display on the indicator array,
the groups of temperature and relative humidity combinations deriving from actual observed mold, mildew and fungus growth, the temperature and relative humidity combinations including the entire actual range of temperature and relative humidity conditions that are favorable for mold, mildew and fungus growth, the first group including temperature conditions above 103 degrees Fahrenheit, the first group including relative humidity conditions below 50% relative humidity, and the second and third groups not including any temperature and relative humidity conditions above 103 degrees Fahrenheit and below 50% relative humidity;
a temperature sensor attached to the microprocessor;
a relative humidity sensor attached to the microprocessor; and
a power supply attached to the microprocessor, where each temperature and relative humidity combination is entered into the map and transmitted to the indicator array.

2. The apparatus for monitoring environmental conditions favorable for mold, mildew and fungus growth of claim 1, where the indicator array comprises at least one warning light.

3. The apparatus for monitoring environmental conditions favorable for mold, mildew and fungus growth of claim 1, where the indicator array comprises an audio speaker.

4. The apparatus for monitoring environmental conditions favorable for mold, mildew and fungus growth of claim 1, where the indicator array comprises a message display.

5. The apparatus for monitoring environmental conditions favorable for mold, mildew and fungus growth of claim 4, where the indicator array displays at least one environmental condition.

6. An apparatus for monitoring environmental conditions favorable for organic infestations, comprising:
means for sensing a temperature;
means for sensing a relative humidity;
means for comparing the temperature and the relative humidity to each other, the means for comparing including
a first group of temperature and relative humidity conditions that are not favorable to mold, mildew and fungus growth and corresponding to no indicator warning display on an indicator array;
a second group of temperature and relative humidity combinations that could be favorable for mold, mildew and fungus growth and corresponding to a cautionary warning display on the indicator array; and
a third group of temperature and relative humidity combinations that are favorable for mold, mildew and fungus growth and corresponding to a warning display on the indicator array,
the groups of combinations of temperature and relative humidity conditions deriving from actual observed mold, mildew and fungus growth, and including the entire actual range of temperature and relative humidity conditions that are favorable for mold, mildew and fungus growth, the first group including temperature conditions above 103 degrees Fahrenheit, the first group including relative humidity conditions below 50% relative humidity, and the second and third groups not including any temperature and relative humidity conditions above 103 degrees Fahrenheit and below 50% relative humidity.

7. The apparatus for monitoring environmental conditions favorable for organic infestations of claim 6, where the displaying means comprises a visual display.

8. The apparatus for monitoring environmental conditions favorable for organic infestations of claim 6, where the displaying means comprises an audio display.

9. The apparatus for monitoring environmental conditions favorable for organic infestations of claim 6, where the displaying means comprises a plurality of display options.

10. A method of monitoring environmental conditions for conditions favorable for mold, mildew and fungus growth, comprising the steps of:
(a) sensing a temperature with a temperature sensor connected to a microprocessor;
(b) sensing a relative humidity with a relative humidity sensor connected to the microprocessor;
(c) entering a data map attached to the microprocessor with the temperature information and the relative humidity information, the data map including
a first group of temperature and relative humidity conditions that are not favorable to mold, mildew and fungus growth and corresponding to no indicator warning display on an indicator array;
a second group of temperature and relative humidity combinations that could be favorable for mold, mildew and fungus growth and corresponding to a cautionary warning display on the indicator array; and
a third group of temperature and relative humidity combinations that are favorable for mold, mildew and fungus growth and corresponding to a warning display on the indicator array,
the groups of combinations of temperature and relative humidity conditions are deriving from actual observed mold, mildew and fungus growth, and including the entire actual range of temperature and relative humidity conditions that are favorable for mold, mildew and fungus growth, the first group including temperature conditions above 103 degrees Fahrenheit, the first group including relative humidity conditions below 50% relative humidity, and the second and third groups not including any temperature and relative humidity conditions above 103 degrees Fahrenheit and below 50% relative humidity;
(d) deriving an environmental condition level from the data map using both the temperature and humidity information simultaneously; and (e) displaying each derived environmental condition on an indicator array.

11. The method of monitoring environmental conditions for conditions favorable for mold, mildew and fungus growth in claim 10, where step (c) further comprises:
(e1) displaying the environmental condition with a visual indicator.

12. The method of monitoring environmental conditions for conditions favorable for mold, mildew and fungus growth of claim 10, where step (e) further comprises:
(e1) displaying the environmental condition with a plurality of visual indicators.

13. The method of monitoring environmental conditions for conditions favorable for mold, mildew and fungus growth of claim 10, where step (e) further comprises:
(e1) displaying the environmental condition with an audio speaker.

14. The method of monitoring environmental conditions for conditions favorable for mold, mildew and fungus growth of claim 10, where step (e) further comprises:
(e) displaying the environmental condition on a digital display.

* * * * *